June 6, 1950
A. G. ROSE
2,510,318
VERTICAL CURVE SECTION FOR POWER-DRIVEN
AND FREEWHEELING TROLLEY CONVEYERS
Filed June 10, 1946
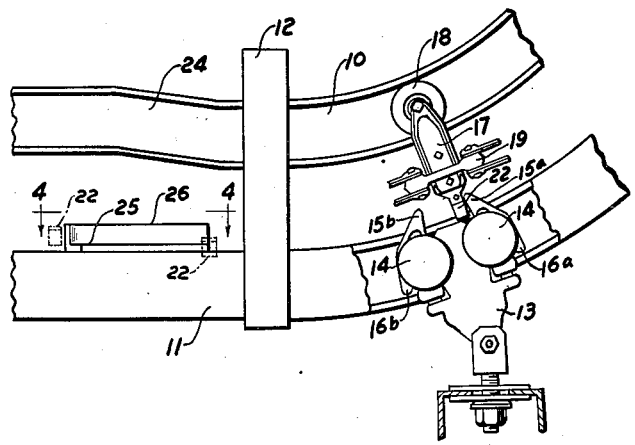
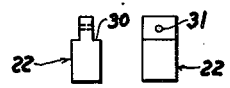
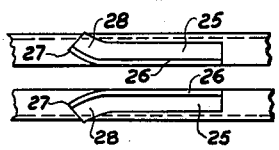
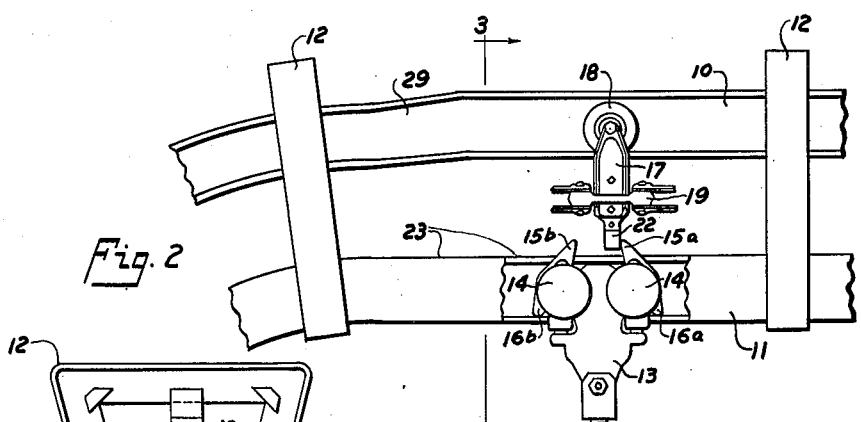
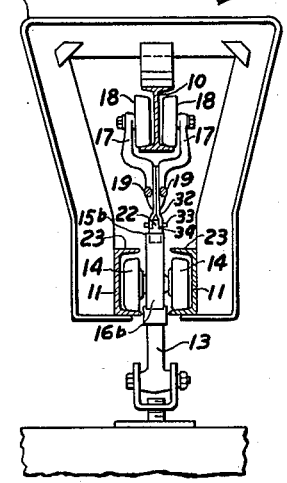
INVENTOR.
ANDREW G. ROSE
BY Joseph Farley
ATTORNEY.

Patented June 6, 1950

2,510,318

UNITED STATES PATENT OFFICE 2,510,318

VERTICAL CURVE SECTION FOR POWER-DRIVEN AND FREE-WHEELING TROLLEY CONVEYERS

Andrew G. Rose, Detroit, Mich., assignor to Jervis B. Webb Company, Detroit, Mich., a corporation of Michigan Application June 10, 1946, Serial No. 675,690

9 Claims. (Cl. 104—91)

This invention relates to overhead trolley conveyors and more particularly to that type thereof known in the art as a power and free trolley conveyor wherein the load is carried by trolley brackets whose wheels run on a pair of opposed channel track members and where a power driven chain is carried by bracket members whose wheels run along an I beam track member spaced above the opposed channel load carrying track members, the bracket members which carry the power chain also being provided each with a driving dog to engage and propel the load carrying trolley brackets along their line of travel.

This type of construction is frequently used where it is desired to have a main conveyor power driven line with branch lines switching off such main line over which the load carrying trolley brackets are pushed by hand. In order to permit the load carrying trolley brackets to be switched off the main line, it is necessary that the power driving means be separable from such load carrying trolley brackets at the switching points. A means frequently used to accomplish this is to provide the load carrying bracket members with a dog or dogs extending upwardly through the opening between the opposed channel load carrying track members and in position to be engaged and driven by the driving dogs that extend downwardly from the bracket members which carry the power chain. As the construction is such that the driving and driven dogs are free to leave each other in a lateral direction, the load carrying bracket members may be freely switched on to branch lines.

While this system is generally satisfactory for level conveyor systems, a problem frequently arises where the loads must be raised or lowered as from floor to floor in a plant. Since the driving and driven dogs are normally made as unmachined forgings, the engaging faces have a certain amount of draft angle (unless machined) and as the driving dogs are usually carried by trolley brackets which are so constructed and supported by their supporting tracks in a manner permitting a substantial lateral swinging of said pusher dogs which are carried at the lower ends of said brackets, the dogs have a marked tendency to slide laterally past each other when exceptionally heavy driving forces exist between them. While the force required to push the load carrying trolley brackets along a level line is relatively small and is ordinarily not great enough to cause such slippage, it may become extremely large where the track is ascending to a new level. Likewise, where the track is descending and the force of gravity acting on the load causes it to tend to travel faster than the driving chain, the same tendency for opposing dogs to slide past each other is substantially increased over that existing on a level conveyor line.

This problem is a very serious one on sections of the track which may be inclined upward or downward, both because of the increased tendency of the driving and driven dogs to slide past each other under the increased forces between them, and because of the safety and damage hazard incident to any such slippage. If such slippage does occur on an incline and the load becomes free to gain momentum down such incline, the possible danger to both life and property are considerable.

The principal object of the present invention is to provide a means for assuring the positive engagement of driving and driven dogs throughout all sections of the conveyor track where change in level occurs.

Another object of the invention is to provide such means without interfering with the freedom of driving and driven dogs to leave each other at switches in the level portions of the track.

These and other objects of the invention will appear more clearly from the following detailed description of a particular embodiment of the invention and from an examination of the drawings forming a part hereof and wherein, Figure 1 is a side elevation of the conveyor tracks where a change from a lower to a higher level occurs along the conveyor's line of travel.

Figure 2 is a similar view of the conveyor tracks at the point where after the track reaches the higher level it continues along a substantially horizontal path.

Figure 3 is a cross section taken along the line 3—3 of Figure 2.

Figure 4 is a plan view of a portion of the lower load supporting track as seen from the line 4—4 of Figure 1.

Figure 5 is an end and side elevation of a driving dog.

Referring to Figures 1 and 2, the power track 10 is an I beam structural member and the load carrying track 11 is a pair of opposed structural channel members. The I beam 10 and channel tracks 11 are supported in properly spaced relationship with each other by a series of yokes 12 which are in turn suitably supported to the building structure by means not shown in the drawing.

The load carrying bracket member 13 is provided with four trolley wheels 14 for running along the track provided by the channel members 11. A pair of dogs 15a and 15b (see Figures 1 and 2) are pivotally mounted at either end of the bracket member 13 with spring means for urging them into a position where their upper ends will extend through the opening between the upper flanges 23 of the channels 11. Such dogs are also provided with lower ends 16a and 16b for limiting the rotation of their upper ends away from the center of the bracket, but permitting such rotation against the spring action toward the center of the bracket.

A pair of trolley bracket members 17 are each provided with a trolley wheel 18 for riding on the lower flanges of the I beam track 10 and such brackets support a driving chain 19 of the "Keystone" type. Spacer bars 32 mounted between the lower ends of bracket members 17 serve to hold such ends in supporting engagement with the side bars of the center link of the driving chain 19. The spacer bars 32 are formed at their lower ends to provide a yoke into which the upper end of the pusher dog 22 may be inserted and held in position by a pin 33 passing through an aperture 31 in the driving dog. The lower edges 34 of the spacer bars 32 seat against a shoulder 30 on either side of the pusher dog 22 and thereby prevent rotation of the pusher dog 22 about the axis of the pin 33. The spring means mentioned in the mounting of dogs 15a and 15b to bracket member 13 permits the entrance of the pusher dog 22 between the dogs 15a and 15b from either end of said bracket member 13, and when the pusher dog 22 is in a position between the dogs 15a and 15b, the limiting means 16a and 16b provide for driving engagement between the pusher dog 22 and the dog 15a in one direction and the dog 15b in the other direction.

While traveling along the normal level course of the conveyor line, the lower surface of the pusher dog 22 is located above the upper surface 23 of the channel members 11, as shown in Figure 4, thereby permitting the load carrying bracket member 13 to be switched off to a branch track.

At the entrance to an inclined section of the conveyor track, as shown in Figure 1, the upper I beam track 10 is provided with a short vertical downward bend or dip 24 which reduces the relative distance between the I beam track 10 and the channel track 11 sufficiently to bring the lower end of the pusher dog 22 down between the opposed upper flanges 23 of the channel track 11 whereby lateral movement of the pusher dog 22 is limited by the edges of such upper flanges. Just ahead of the bend 24 in the I beam track 10, two guiding members 25 are located on the upper surface of each of the channel members 11 of the lower track. The upper surface 26 of the guide members 25 extends sufficiently above the upper surface of the channel members 11 to lie above the lower surface of the pusher dog 22 in normal running position, and the inner surface 27 of the entrance ends 28 of the guide members 25 are curved outwardly for a distance exceeding the maximum possible lateral displacement of the pusher dog 22 from the center line of the conveyor track.

The guide members 25 thus serve to center the pusher dog 22 as it enters between them and, due to the travel of the trolley wheel 18 of its bracket 17 down the dip 24, the lower end of the pusher dog 22 will be positioned between the upper flanges of the channel members 11. At the far end of the inclined track where a new level is reached, as shown in Figure 2, the I beam member 10 is provided with a vertical upward bend 29 which increases the relative distance between the I beam 10 and the channel members 11 to their normal running position and so that the lower surface of pusher dog 22 again lies above the upper surface 23 of channel members 11.

Since the combined width of the pusher dog 22 and driven dog 15a or 15b is substantially greater than the width of the open space between the upper flanges 23 of channel members 11, it is impossible for the pusher dog 22 to move laterally sufficient to pass either of the driven dogs 15a or 15b while it is positioned between such upper flanges.

Thus, it is seen that by an extremely simple and economical means, positive engagement of the driving and driven dogs is provided at inclined sections of the track where forces between such dogs become relatively large and where the safety and property damage hazards incident to the possible disengagement of such driving and driven dogs are at a maximum, while retaining the feature in this type of conveyor system which permits switching of load carrying brackets to branch tracks at all level sections where the force between driving and driven dogs is relatively small.

While the above description relates to a particular embodiment of the present invention, it is clear that a number of departures from the specific construction are possible without departing from the spirit of the invention as described in the following claims.

I claim:

1. In a power and free conveyor system of the type wherein load carrying members run along a conveyor track comprising a pair of laterally opposed spaced channel members and such load carrying members are provided with driven dogs that extend upwardly between and beyond the upper flanges of such channel members and where a powered driving means carried by an upper track disposed vertically over said conveyor track is provided with driving dogs for engaging said upwardly extending driven dogs, the lower surface of such driving dogs being normally positioned above the upper surface of said channel members in a manner whereby said load carrying members may be switched from said conveyor track onto branch tracks, means for insuring continuous driving contact between said driving dogs and said driven dogs at sections of the conveyor line inclined to a horizontal plane, said means comprising a vertical downward dip in said upper track as it nears such inclined sections to cause said driving dogs to be moved downwardly to extend between the upper flanges of said channel members, the distance between said upper flanges being less than the combined width of said driving and driven dogs.

2. In a power and free conveyor system of the type wherein load carrying members run along a conveyor track comprising a pair of laterally opposed spaced channel members and such load carrying members are provided with driven dogs that extend upwardly between and beyond the upper flanges of such channel members and where a powered driving means carried by an upper track disposed vertically over said conveyor track is provided with driving dogs for engaging said upwardly extending driven dogs, the lower surface of such driving dogs being normally positioned above the upper surface of said channel members in a manner whereby said load carrying members may be switched from said conveyor track onto branch tracks, means for insuring continuous driving contact between said driving dogs and said driven dogs at sections of the conveyor line inclined to a horizontal plane, said means comprising a vertical downward dip in said upper track as it nears such inclined sections to cause said driving dogs to be moved downwardly to extend between the upper flanges of said channel members, the distance between said upper flanges being less than the combined width of said driving and driven dogs, and opposed guide members secured to said upper flanges and substantially co-extensive in length with said dip to hold said driving dogs in alignment with the space between said flanges as said dogs are lowered.

3. In a power and free conveyor system of the type wherein load carrying members run along a conveyor track comprising a pair of laterally opposed spaced channel members and such load carrying members are provided with driven dogs that extend upwardly between and beyond the upper flanges of such channel members and where a powered driving means carried by an upper track disposed vertically over said conveyor track is provided with driving dogs for engaging said upwardly extending driven dogs, the lower surface of such driving dogs being normally positioned above the upper surface of said channel members in a manner whereby said load carrying members may be switched from said conveyor track onto branch tracks, means for insuring continuous driving contact between said driving dogs and said driven dogs at sections of the conveyor line inclined to a horizontal plane, said means comprising a vertical downward dip in said upper track as it nears such inclined sections to cause said driving dogs to be moved downwardly to extend between the upper flanges of said channel members, the distance between said upper flanges being less than the combined width of said driving and driven dogs, and opposed guide members secured to said upper flanges and substantially co-extensive in length with said dip to hold said driving dogs in alignment with the space between said flanges as said dogs are lowered, said guide members being constructed of angle sections, one leg of which is secured to the upper horizontal surface of said upper flanges and the other leg of which for the major length of said dip is aligned with the inner edge of said flange.

4. A structure as set forth in claim 2 in which said guide members are flared outwardly at their entrance end to facilitate the entry of said driving dogs into the space between said guide members.

5. In a power and free conveyor system of the type wherein load carrying members run along a conveyor track comprising a pair of laterally opposed spaced channel members and such load carrying members are provided with driven dogs that extend upwardly between and beyond the upper flanges of such channel members and where a powered driving means carried by an upper track disposed vertically over said conveyor track is provided with driving dogs for engaging said upwardly extending driven dogs, the lower surface of such driving dogs being normally positioned above the upper surface of said channel members in a manner whereby said load carrying members may be switched from said conveyor track onto branch tracks, means for insuring continuous driving contact between said driving dogs and said driven dogs at sections of the conveyor line inclined to a horizontal plane, said means comprising a vertical downward dip in said upper track as it nears such inclined sections to cause said driving dogs to be moved downwardly to extend between the upper flanges of said channel members, the distance between said upper flanges being less than the combined width of said driving and driven dogs, and an upward inclination of said upper track at the end of each of said sections to restore the normal positioning of said dogs.

6. In an overhead power and free trolley conveyor system wherein laterally disengageable driving means are provided between load supporting trolley assemblies adapted to travel along a conveyor track and an independently supported drive chain in a manner whereby lateral switching of the trolley assemblies away from the power line and onto a free spur line or vice versa may be accomplished with automatic disengagement or engagement of the power drive, means for positively preventing lateral disengagement throughout limited sections of the conveyor line characterized by a relatively closer spacing of said drive chain and said conveyor track at said limited sections than prevails at other sections of said conveyor line, and laterally confining surfaces rendered operative throughout said limited sections by said closer spacing to limit the relative lateral positions of drive and driven members within a space less than that required for disengagement.

7. In an overhead power and free trolley conveyor system wherein laterally disengageable driving means are provided between load supporting trolley assemblies adapted to travel along a conveyor track and an independently supported drive chain in a manner whereby lateral switching of the trolley assemblies away from the power line and onto a free spur line or vice versa may be accomplished with automatic disengagement or engagement of the power drive, means for positively preventing lateral disengagement throughout limited sections of the conveyor line characterized by a spacing of said drive chain and said conveyor track at said limited sections adapted to bring the driving means associated with said power chain into a position relative to portions of said conveyor track such as to positively restrict the lateral movement of such driving means to less than that required for disengagement.

8. In an overhead power and free trolley conveyor system wherein laterally disengageable driving means are provided between load supporting trolley assemblies adapted to travel along a conveyor track and an independently supported drive chain, said conveyor track comprising a pair of opposed channel members, a drive receiving member associated with said trolley assemblies projecting above the upper webs of said channel members, a drive delivering member associated with said drive chain, the lower extremity of which is normally above the upper level of said webs, and means for positively preventing lateral disengagement throughout limited sections of the conveyor line characterized by a relatively closer than normal spacing of said drive chain and said conveyor track at said sections such as to cause said drive delivering member to extend between said webs and wherein the combined width of said drive delivering and receiving members is less than the space between said webs.

9. A power and free trolley conveyor system employing separable driving and driven members and vertical curves in the track wherein the drive is disengageable on horizontal portions of the track through relative lateral displacement of said driving and driven members and wherein disengagement of the drive is positively prevented on inclined sections of the track, the track being arranged at said inclined sections to confine the paths of said driving and driven members to a transverse space having a width less than the combined width of said driving and driven members.

ANDREW G. ROSE.

REFERENCES CITED

The following references are of record in the file of this patent:

UNITED STATES PATENTS

| Number | Name | Date |
|---|---|---|
| 1,920,774 | Webb | Aug. 1, 1933 |
| 1,921,109 | Webb et al. | Aug. 8, 1933 |
| 1,949,691 | Nehrer et al. | Mar. 6, 1934 |